(12) United States Patent
Zhuikov et al.

(10) Patent No.: US 8,290,110 B2
(45) Date of Patent: Oct. 16, 2012

(54) TARGETS AND METHODS FOR TARGET PREPARATION FOR RADIONUCLIDE PRODUCTION

(75) Inventors: Boris L. Zhuikov, Moscow (RU); Nicolai A. Konyakhin, Kaluga (RU); Vladimir M. Kokhanyuk, Moscow (RU); Suresh C. Srivastava, Setauket, NY (US)

(73) Assignee: Brookhaven Science Associates

( * ) Notice: Subject to any disclaimer, the term of this patent is extended or adjusted under 35 U.S.C. 154(b) by 241 days.

(21) Appl. No.: 12/424,992

(22) Filed: Apr. 16, 2009

(65) Prior Publication Data

US 2010/0067638 A1    Mar. 18, 2010

(30) Foreign Application Priority Data

Sep. 12, 2008    (RU) ................. 2008136585

(51) Int. Cl.
*G21G 1/12*    (2006.01)
(52) U.S. Cl. .................... 376/157; 376/156; 376/158
(58) Field of Classification Search ................. 376/157, 376/156, 158
See application file for complete search history.

(56) References Cited

U.S. PATENT DOCUMENTS

| | | | |
|---|---|---|---|
| 3,564,348 A | | 2/1971 | Cheseldine |
| 4,839,133 A | * | 6/1989 | Vandegrift et al. ............ 376/202 |
| 5,342,283 A | * | 8/1994 | Good ................................ 600/8 |
| 5,425,063 A | * | 6/1995 | Ferrieri et al. ................. 376/195 |
| 5,929,437 A | * | 7/1999 | Elliott et al. .................. 250/259 |
| 6,144,690 A | | 11/2000 | Kusamichi et al. |
| 2007/0034373 A1 | * | 2/2007 | McDaniel et al. ......... 166/250.1 |

OTHER PUBLICATIONS

A. Kjekshus et al. On the Phase Relationships in the Titanium-Antimony System: The Crystal Structures of Ti3Sb. Acta Chemica Scandinavica 16, (1962), pp. 1493-1510.
T.B. Massalski et al. "Ti-Sb Phase Diagram" in Binary Alloy Phase Diagram, vol. 2, American Society for Metals, published Oct. 1986, pp. 2017, 2022, 2023.
United States Patent and Trademark Office, Office Action regarding U.S. Appl. No. 12/424,944, mailed Aug. 17, 2011.

\* cited by examiner

*Primary Examiner* — Ricardo Palabrica
(74) *Attorney, Agent, or Firm* — Wood, Herron & Evans, LLP

(57) ABSTRACT

The invention relates to nuclear technology, and to irradiation targets and their preparation. One embodiment of the present invention includes a method for preparation of a target containing intermetallic composition of antimony Ti—Sb, Al—Sb, Cu—Sb, or Ni—Sb in order to produce radionuclides (e.g., tin-117 m) with a beam of accelerated particles. The intermetallic compounds of antimony can be welded by means of diffusion welding to a copper backing cooled during irradiation on the beam of accelerated particles. Another target can be encapsulated into a shell made of metallic niobium, stainless steel, nickel or titanium cooled outside by water during irradiation. Titanium shell can be plated outside by nickel to avoid interaction with the cooling water.

7 Claims, 1 Drawing Sheet

TARGETS AND METHODS FOR TARGET PREPARATION FOR RADIONUCLIDE PRODUCTION

This invention was made with Government support under contract number DE-AC02-98CH10886, awarded by the U.S. Department of Energy. The Government has certain rights in the invention.

FIELD OF THE INVENTION

The invention relates to nuclear technology, and to irradiation targets and their preparation. Such targets can be irradiated by an intensive accelerator beam to obtain various radioactive isotopes from Sb-containing targets. For example, $^{117m}$Sn in a no-carrier-added (NCA) form may be produced.

BACKGROUND OF THE INVENTION

Targets and methods for target preparation from Ga—Ni alloys have been used for production of $^{68}$Ge using a proton beam accelerator (C. Loch et al., "A New Preparation of Germanium-68", Int. J. Appl. Radiat. Isot., 33, 261-270 (1982); N. R. Stevenson et al., A New Production Method for Germanium-68, Synthesis and Application of Isotopically Labelled Compounds, Ed. J. Allen, John Willey & Sons, 1995, p. 119-223; A. A. Razbach et al., "Production of Germanium-68 in Russia", Proc. 6$^{th}$ Workshop on Targetry and Target Chemistry, Vancouver, Canada, 1995, p. 5114)). The Ga—Ni alloys were electrodeposited onto copper backing or pressed onto a copper block heated after or during pressing. Tin-117m cannot be produced from such target material.

A target was prepared from thick pure antimony monolith in a target shell to provide $^{117m}$Sn (B. L. Zhuikov et al., Process and targets for production of no-carrier added radiotin, Russian patent No. 2313838 (published Dec. 27, 2007)). However, pure Sb has a low heat conductivity and thermal stability. This can result in melting and sublimation of the pure Sb during exposure to intensive proton beams and can result in destruction of the target shell.

Additional targets and methods for their preparation are thus desirable,

SUMMARY OF THE INVENTION

The present invention relates to nuclear technology, and to irradiation targets and their preparation. Some embodiments provide for the production of a target for irradiation by an intensive accelerator beam to obtain various radioactive isotopes from Sb-containing targets. One embodiment of the invention is a target for redionuclide production wherein the target comprises an intermetallic composition of natural or enriched antimony. Suitable alloys include antimony and titanium, antimony and copper, antimony and nickel, or antimony and aluminum. The composition can be welded to a copper target backing which is cooled during irradiation. The target surface facing the accelerator beam can be covered with a thin layer of a metal.

In another embodiment, the intermetallic composition is encapsulated in a metallic shell and can be cooled by water during irradiation. The shell can be made of metallic niobium, stainless steel, nickel, or titanium. The shell can be plated with nickel The composition can be welded to a copper backing block by means of diffusion welding in vacuum at pressure 80-160 kG/cm$^2$ and temperature of 360-440° C. The block can be cooled with water during the target irradiation at the accelerator.

According to another embodiment, the composition may be attached to the target shell of the above mentioned materials by means of diffusion welding in vacuum performed with pressure 200-300 KG/cm$^2$ on the target square and at a temperature of 600-1000° C.

In still another embodiment, the target shell can be made of titanium plated with nickel by means of diffusion welding of nickel foil, or electroplating by copper and then by nickel, or decomposing of nickel carbonyl at the heated target shell in dynamic vacuum.

In still another embodiment, Ti—Sb composition is electroplated directly with nickel of thickness 40-100 μm.

These and other features, aspects, and advantages of the present invention will become better understood with regard to the following description, claims and accompanying drawings wherein:

DETAILED DESCRIPTION

Figure 2:
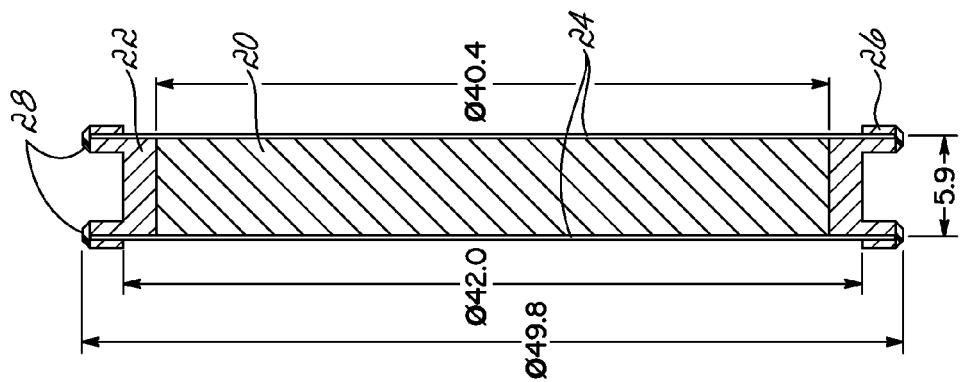
FIG. 2 is a diagrammatic cross sectional view of a target.

This invention relates to irradiation targets and their method of preparation. In one embodiment, an antimony containing target comprises an intermetallic composition of antimony which can then be irradiated with a beam of charged particles, such as protons. The beam can be a high current beam. Radioactive no-carrier-added (NCA) tin-117m can be produced using a proton beam. Other radioactive isotopes of tin, tellurium, iodine, or other elements can be produced using Sb-containing targets irradiated with protons, deuterons, or alpha-particles.

In exemplary embodiments, the target can contain intermetallic compounds of natural antimony or enriched antimony (e.g., $^{123}$Sb). Thermal stability, heat conductivity, content of the element to produce the desired isotope in nuclear reactions, as well as interaction with a target shell are some of the parameters that can provide a stable and useful target that can be irradiated by a high beam current. A number of intermetallic compositions can provide stable and useful targets, including for example, intermetallic compounds or eutectic solid solutions. The intermetallic compositions can comprise compounds or eutectic solutions of Sb combined with another metal, including, for example, Ti, Ni, Cu, Ag, or Al.

For example, TiSb, NiSb, and AlSb are thermally stable; the melting points of these compounds are 1160° C., 1147° C., and 1058° C., and the heat of formation 167, 32-66 and 49 kJ/mol, respectively. Thermally stable compounds, including the above three compounds, do not decompose to the extent that could provide an unstable or useless target. Pure Sb, which has a melting point of 630° C., sublimes and can destroy the target shell. The heat conductivity of TiSb is higher than pure Sb and Ti. A number of other intermetallic compounds and alloys can also be used for target preparation, including, for example Ag—Sb and TiSb$_2$.

In the formation of TiSb, the intermetallic composition contains antimony not less than 40 atomic % (63 weight %) and not more than 50 atomic % (72 weight %). A higher concentration of Sb may lead to the presence of pure antimony at heating, while a lower concentration of antimony reduces the production rate of radioactive isotopes from irradiated antimony-containing target. An antimony concentration of not less than 48 atomic % (70 weight %) and not more than 49 atomic % (71 weight %) is preferable. The ratio of Ti:Sb which is close to 50 atomic % also provides higher melting point, i.e., 1160° C., in the composition, which is important for temperature stability.

The antimony may be natural enriched antimony ($^{121}$Sb or $^{123}$Sb) for future isotope production.

In an exemplary embodiment, intermetallic TiSb-composition forms a massive block comprising monolith with density not less than 95% of X-ray density of the compound. Lower densities lead to a lower heat conductivity and mechanical strength.

The eutectic solid solutions can comprise Cu and Sb. For example, a eutectic solid solution of Cu with Sb (63 atomic % of Cu, melting point 526° C.) has a greater heat conductivity (56±5 W/m·K) compared to pure Sb (17-21 W/m·K). Targets based on these intermetallic compositions can be irradiated at a high beam current.

The intermetallic may also comprise NiSb, AlSb or TiSb. The heat conductivity of TiSb is greater than Ti or Sb.

Figure 1:
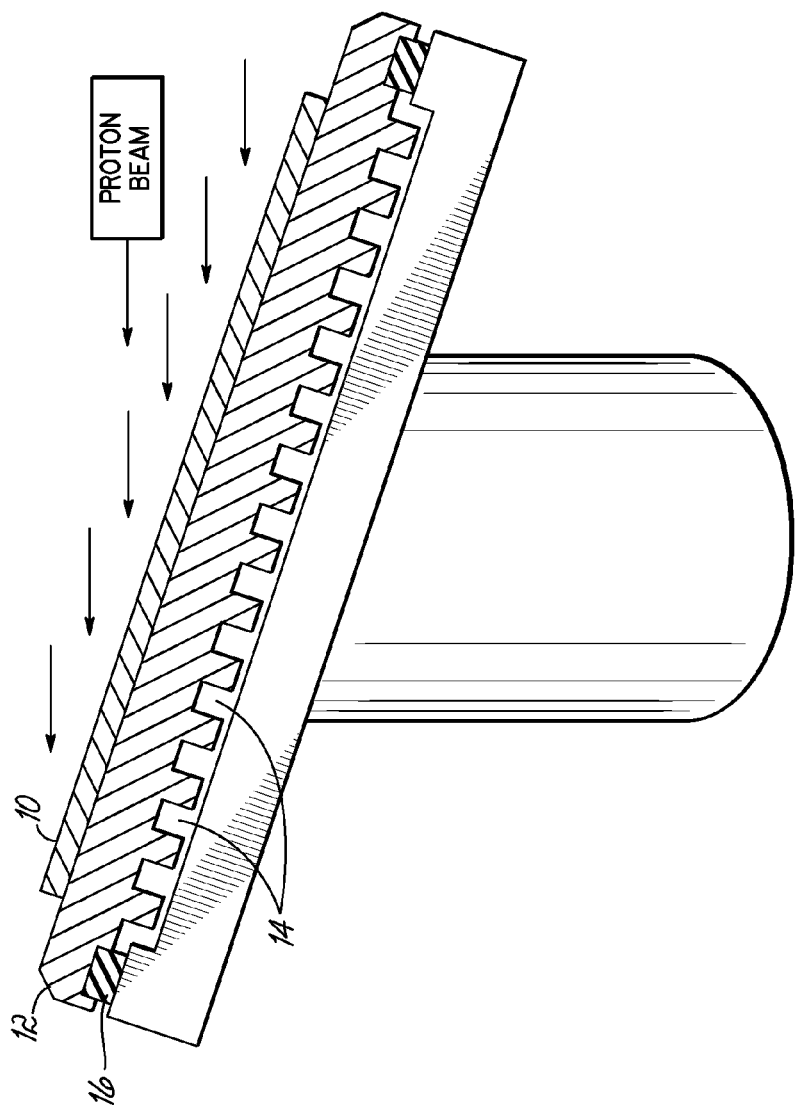
FIG. 1 is a diagrammatic cross sectional view of a target mounted on a holder.

The intermetallic composition can be welded (e.g., using diffusion welding to a backing block prior to irradiation. FIG. 1 shows an embodiment of a target design with an intermetallic compound welded to the cooled copper backing 12 and irradiated at an accelerator. The irradiated target material 10 is covered with a thin layer of a metal. The backing block is cooled with water going in channels 14. The water is sealed with a radiation stable gasket 16. This backing block can be cooled during the irradiation. This design can be used, for example, with targets (such as thin targets) that will be irradiated for $^{117m}$Sn production at low proton inlet energies (e.g., 30-40 MeV). In some instances, the backing block design can be used with 1-2 mm targets in the beam direction or with a thinner target if the beam is directed to the target surface with a smaller beam angle (e.g., 6-12°).

The backing block can be made from a number of materials including for example, metals with a high heat conductivity, metallic silver, various copper alloys, and copper. Diffusion welding can be performed, for example, in a vacuum at 80-160 kG/cm$^2$ (or at 90-110 kG/cm$^2$) and at a temperature of 360-440° C. The target surface facing the beam can be covered with a thin layer of a metal. In some instances, this thin layer can protect the target or lessen Sb evaporation in the accelerator vacuum. A number of different materials can be used to form this thin layer including for example, nickel or other inorganic materials. This thin layer can be 1, 2, 3, 4, 5, 6, 7, 8, 9, or 10 microns thick.

In another exemplary embodiment, the intermetallic composition, can be encapsulated in a shell prior to irradiation. The shell can be a hermetic shell. The shell can be cooled by water flowing around one or more sides of the target. FIG. 2 shows an embodiment of a target design with an Sb-containing intermetallic composition encapsulated in a metallic shell cooled outside by water during irradiation. The composition 20 is encapsulated into metallic shell 22. Inlet and outlet target windows 24 (100 μm foils) can be plated with Ni-layer (50-100 μm thickness) and can be welded by means of diffusion welding to the intermetallic composition 20. Metallic rings 26 (0.5 mm thickness) can strengthen the design and can provide a reliable electron beam welding with joint 28. Dimensions are given in mm. This design can be used, for example, during $^{117m}$Sn production using a proton beam with an inlet proton energy of 55 MeV or higher. The shell can be made from any number of metals, alloys or the like, including for example, metallic niobium, nickel, stainless steel, or titanium. The shell can be closed (e.g., sealed or hermetically sealed) by welding, such as diffusion welding. For example, diffusion welding can be performed in a vacuum under pressure of 200 kG/cm$^2$ or more, or 300 kG/cm$^2$ or less on the target square (or, for example, 250-280 kG/cm$^2$), and at temperature from 600° C. to 1000° C. (or 800-900° C.). The shell can be additionally closed (e.g., sealed or hermetically) around the periphery of the target shell by means of electron beam or laser welding; this can provide more reliable encapsulation.

Cooling water under a high intensity proton beam can become more chemically active (due to, for example, radiolysis) and can, in some instances, deteriorate or destroy some materials. In some embodiments, the outer surface of the shell can withstand cooling water under a high intensity proton beam, and thus may be more suitable for the shell. For example, stainless steel, niobium, and nickel can be used for the shell material. Inconel (austenitic nickel-based superalloys) or other nickel- and chromium-base alloys can also be used as the shell material. Materials that may not be stable on their own can be plated, e.g., nickel plating, to reduce or prevent interaction with water under the proton beam. In some embodiments, the shell material can be plated with nickel. Shell materials that can be plated include, for example, AlSb, TiSb, NiSb, titanium, molybdenum, tungsten, aluminum, zinc, graphite, copper and tantalum. In some embodiments, the plated nickel thickness can be from 40 μm to 100 μm.

A shell that excludes elements that produce undesirable radionuclides upon proton beam exposure can be useful. Undesirable radionuclides can be implanted in the composition material as recoil atoms and can sometimes require an additional chemical purification of $^{117m}$Sn from the other radionuclides. For example, Ti does not produce additional undesirable radionuclides upon proton beam exposure and thus the Ti—Sb shell material can provide a useful shell material. TiSb can be encapsulated in a titanium shell by means of welding, such as diffusion welding. For example, diffusion welding can be performed in a vacuum under pressure of 200-300 kG/cm$^2$ on the target square (or, for example, 250-280 kG/cm$^2$), and at temperature from 600° C. to 1000° C. (or 800-900° C.). Under these temperature and pressure conditions, the titanium is adequately welded and good contact between the titanium shell and Ti—Sb composition is provided; this can improve target cooling during irradiation. The target shell can be additionally closed around the periphery of the target shell by means of electron beam or laser welding; this can provide more reliable encapsulation.

The titanium shell can be plated by nickel to aid in the protection from the interaction with water during irradiation. It can be difficult to directly electroplate titanium with nickel because titanium can form a stable oxide film on its surface. In these and other such situations, other methods can be used to plate with nickel. For example, three methods can be used to provide titanium plating with nickel: (1) preliminary electroplating of titanium with copper layer and then with nickel as it is described for example in (V. I. Lainer. Galvanic plating of light alloys. Moscow. Metallurgizdat, 1959); (2) plating by means of nickel carbonyl decomposing at the heated target shell in dynamic vacuum at temperature not less than 400° C. when the oxide film is not sufficiently strong, nickel sputtering in vacuum is also possible; and (3) diffusion welding of nickel foil with titanium shell, that can be performed in the same process of diffusion welding of titanium shell with the foregoing pressure and temperature parameters, before, or after titanium shell welding.

The targets fabricated by the above methods can be irradiated at high intensity beams of accelerated particles to produce $^{117m}$Sn and other radionuclides generated from natural or enriched antimony.

The invention will be further appreciated in light of the following examples.

EXAMPLE 1

A plate of a copper alloy containing 62 atomic % Sb (76% in weight) thickness 0.4 mm was welded by means of diffusion welding to a copper backing block, as shown in FIG. 1. The diffusion welding was performed at unit pressure 100 kG/cm and temperature 400° C. (melting pressure of the alloy is 526° C.). The copper block from the back side had channels for cooling water; the water velocity was 4 m/s. The target was oriented to the beam at an angle of 11°. The target was irradiated by a proton beam having an energy range of 40-26 MeV, a beam current of 500 µA, and a beam spot area was of 12 cm$^2$. Energy release in the target material was 580 W/cm$^2$, and the maximum calculated temperature on the target surface was 350° C. The production rate of $^{117m}$Sn was 3.2 mCi/h.

EXAMPLE 2

A round plate of Ti—Sb composition, containing 44 atomic % Sb (67% in weight), thickness 2.2 mm, diameter 45 mm was electroplated with nickel (layer thickness is 40 µm). The target cooled in all sides by water flow was irradiated with a proton beam (beam angle was 26°) with a beam current of 100 µA in the energy range 55-30 MeV. The production rate of $^{117m}$Sn on the target material containing natural Sb was 2.3 mCi/h. There were no considerable admixtures of $^{113}$Sn. Using enriched $^{123}$Sb material in a similar target, the production rate was 3.6 mCi/h.

EXAMPLE 3

A ring plate of TiSb composition 5.8 mm thick inside titanium body ring (outer diameter is 50 mm, inner diameter is 40 mm), as shown in FIG. 2, was covered from the both sides by titanium (100 µm) and then nickel (50 µm) foils. The foils were welded to the plate by means of diffusion welding in vacuum under press 5200-5500 kG at 850° C. during 25 min. When the temperature was 600-650° C. the titanium foil was welded well to the titanium body ring but not to the TiSb composition. The obtained detail was additionally enhanced with 0.5 mm titanium rings and welded around by electron beam for a better sealing.

The resulting target was irradiated on proton beam (at angle 26°) in energy range 120-85 MeV with beam current 100 µA and the target was cooled from all sides by water flow. The production rate of $^{117m}$Sn was 20 mCi/h. Considerable amounts of $^{113}$Sn were also produced in this target.

This has been a description of the present invention along with the preferred method of practicing the present invention. However, the invention itself should only be defined by the appended claims.

What is claimed is:

1. A target for radionuclide production resulting from exposure to a beam of accelerated particles wherein the target comprises a layer of an intermetallic composition of antimony bonded to a backing block comprising a metal and having cooling passages adapted to circulate a cooling fluid.

2. The target of claim 1 wherein the antimony is enriched with antimony-123.

3. The target of claim 1 wherein the intermetallic composition comprises alloys of antimony and an element selected from the group consisting of titanium, copper, nickel, and aluminum.

4. The target of claim 1 wherein the intermetallic composition comprises antimony and titanium.

5. The target of claim 1 wherein the intermetallic composition is diffusion welded to a backing block.

6. The target of claim 1 wherein the intermetallic composition is encapsulated by a target shell comprising a material substantially resistant to water under a high intensity beam of accelerated particles.

7. A target for radionuclide production resulting from exposure of a beam of accelerated particles wherein the target comprises an intermetallic composition of antimony and an element selected from a group consisting of titanium, copper, nickel and aluminum wherein said antimony is enriched with antimony-123.

* * * * *